(12) United States Patent
Hagale et al.

(10) Patent No.: US 7,797,390 B2
(45) Date of Patent: *Sep. 14, 2010

(54) METHOD AND SYSTEM FOR DISAPPEARING INK FOR TEXT MESSAGING

(75) Inventors: Anthony Richard Hagale, Austin, TX (US); Ryan Rozich, Austin, TX (US); Paul Stuart Williamson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/411,097

(22) Filed: Mar. 25, 2009

(65) Prior Publication Data

US 2009/0177978 A1 Jul. 9, 2009

(51) Int. Cl.
*G06F 15/16* (2006.01)
(52) U.S. Cl. ............. 709/206; 715/500.1; 715/751
(58) Field of Classification Search .......... 709/206; 455/466
See application file for complete search history.

(56) References Cited

U.S. PATENT DOCUMENTS

| | | | |
|---|---|---|---|
| 5,786,817 A | 7/1998 | Sakano et al. |
| 5,982,853 A | 11/1999 | Liebermann |
| 6,088,720 A | 7/2000 | Berkowitz et al. |
| 6,311,215 B1 | 10/2001 | Bakshi et al. |
| 6,324,569 B1 | 11/2001 | Ogilvie et al. |
| 6,336,133 B1 | 1/2002 | Morris et al. |
| 6,484,196 B1 | 11/2002 | Maurille |
| 6,665,531 B1 | 12/2003 | Soderbacka et al. |
| 6,701,347 B1 | 3/2004 | Ogilvie |
| 6,771,749 B1 | 8/2004 | Bansal et al. |
| 6,823,363 B1 | 11/2004 | Noveck et al. |
| 6,907,447 B1 | 6/2005 | Cooperman et al. |
| 7,115,035 B2 | 10/2006 | Tanaka |
| 7,149,893 B1 | 12/2006 | Leonard et al. |
| 7,188,177 B2 | 3/2007 | Taylor |
| 7,191,219 B2 | 3/2007 | Udell et al. |
| 7,400,712 B2 | 7/2008 | August |
| 7,418,495 B2 | 8/2008 | Glasser et al. |

(Continued)

FOREIGN PATENT DOCUMENTS

CA 2389472 12/2003

(Continued)

OTHER PUBLICATIONS

Godefroid et al., Ensuring Privacy in Presence Awareness Systems: An Automated Verification Approach, 2002, pp. 59-69.

(Continued)

*Primary Examiner*—Dustin Nguyen
(74) *Attorney, Agent, or Firm*—Yee & Associates, P.C.; David A. Mims, Jr.

(57) ABSTRACT

An instant messaging client presents messages and removes the messages from display after a predetermined amount of time. In one preferred embodiment, the predetermined amount of time is agreed upon by all participants during a policy negotiation. Each message may be associated with a display time and when the current time differs from the display time by a predetermined amount, the message is removed from the display. Messages may also be presented in a non-editable display area to prevent manual logging of the messaging content.

2 Claims, 5 Drawing Sheets

U.S. PATENT DOCUMENTS

| | | | |
|---|---|---|---|
| 7,463,897 | B2 | 12/2008 | Kock |
| 7,464,139 | B2 * | 12/2008 | Malik .................... 709/206 |
| 7,522,712 | B2 | 4/2009 | Inon |
| 2002/0052919 | A1 | 5/2002 | Morris et al. |
| 2002/0065894 | A1 | 5/2002 | Dalal et al. |
| 2003/0077559 | A1 | 4/2003 | Braunberger et al. |
| 2003/0105822 | A1 | 6/2003 | Gusler et al. |
| 2003/0105825 | A1 | 6/2003 | Kring et al. |
| 2003/0208543 | A1 | 11/2003 | Enete et al. |
| 2003/0229722 | A1 | 12/2003 | Beyda |
| 2003/0236892 | A1 | 12/2003 | Coulombe |
| 2004/0249900 | A1 | 12/2004 | Karstens |
| 2005/0114753 | A1 | 5/2005 | Kumar et al. |
| 2005/0154594 | A1 | 7/2005 | Beck |
| 2005/0267942 | A1 | 12/2005 | Quinn et al. |
| 2005/0281397 | A1 | 12/2005 | Hagale et al. |
| 2006/0036739 | A1 | 2/2006 | Hagale et al. |
| 2006/0117264 | A1 | 6/2006 | Beaton et al. |
| 2009/0042588 | A1 * | 2/2009 | Lottin et al. ............ 455/466 |

OTHER PUBLICATIONS

Handel et al., "What is Chat Doing in the Workplace", 2002, pp. 1-10.
Liscano et al., "Configuring a Personal Communications Agent", Proceedings of the 4th International Conf on the Practical Applications of Intelligent Agents and Multi agent Technology, UK, 1999, 1 page.
Research Disclosure 4311173-A, "Secure and User Friendly Voice Cybervault for Computer Logins and Passwords to Multiple Local & Remote Services Using Text Independent Speaker Recognition and Continuous Speech Recognition", Mar. 10, 2000, pp. 1.

* cited by examiner

METHOD AND SYSTEM FOR DISAPPEARING INK FOR TEXT MESSAGING

CROSS REFERENCE TO RELATED APPLICATIONS

The present invention is related to an application entitled "METHOD AND SYSTEM FOR REMOVING MESSAGING INFORMATION IN A MESSAGING CLIENT," U.S. patent application Ser. No. 10/916,968, filed even date hereof, assigned to the same assignee, and incorporated herein by reference, now abandoned.

BACKGROUND OF THE INVENTION

1. Technical Field

The present invention relates to data processing and, in particular, to text messaging systems. Still more particularly, the present invention provides a method, apparatus, and program for presenting disappearing ink for text messaging.

2. Description of Related Art

Instant messaging involves exchanging messages in real time between two or more people. Unlike a dial-up system such as the telephone, instant messaging requires that both parties be logged onto their instant messaging service at the same time. Instant messaging is also known as a "chatting," and an instant messaging client may also be referred to as a text messaging client or a chat client. Instant messaging has become very popular for both business and personal use. In business use, instant messaging provides a way to contact co-workers any time of the day, as long as the participants are available and at their computers.

Instant messaging is often referred to as text messaging, although messages may include non-text content, such as, for example, images and sounds. In business and personal use, instant messaging sessions may contain sensitive information. For example, co-workers may have conversations relating to products being developed. A customer may have an instant messaging conversation with technical support in which account numbers are mentioned. It would be advantageous to protect instant messaging sessions in which sensitive information is discussed.

SUMMARY OF THE INVENTION

The present invention recognizes the disadvantages of the prior art and provides an instant messaging client that presents messages and removes the messages from display after a predetermined amount of time. In one preferred embodiment, the predetermined amount of time is agreed upon by all participants during a policy negotiation. Each message may be associated with a display time and when the current time differs from the display time by a predetermined amount, the message is removed from the display. Messages may also be presented in a non-editable display area to prevent manual logging of the messaging content.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
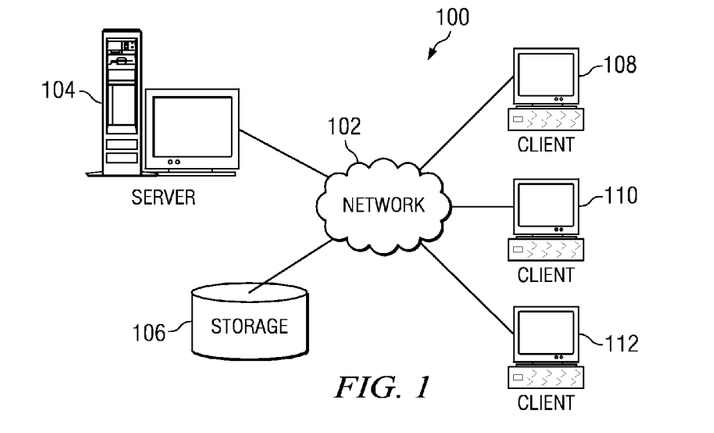
FIG. 1 depicts a pictorial representation of a network of data processing systems in which the present invention may be implemented.
Figure 2:
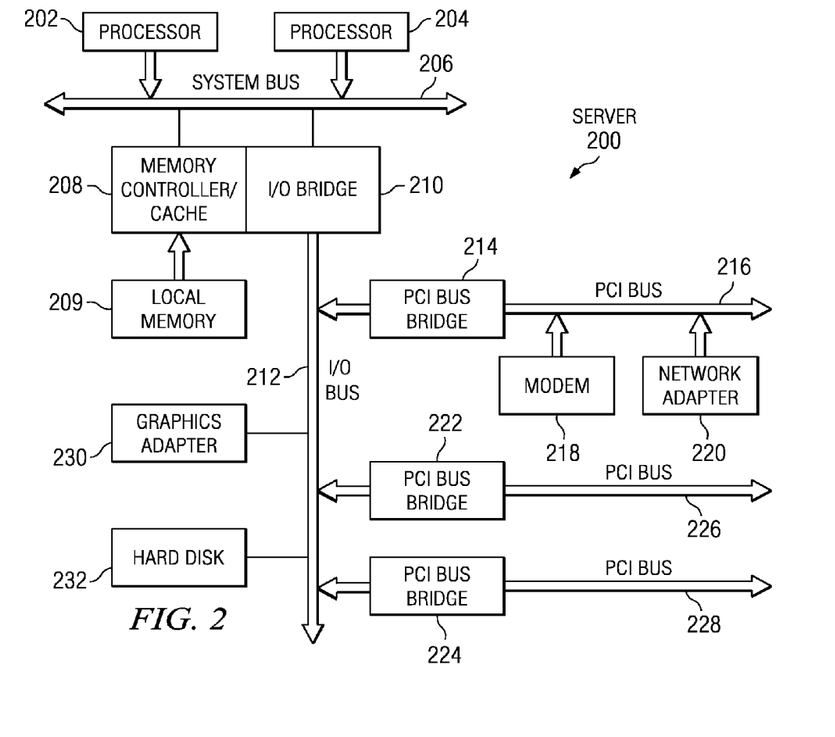
FIG. 2 is a block diagram of a data processing system that may be implemented as a server in accordance with a preferred embodiment of the present invention.
Figure 3:
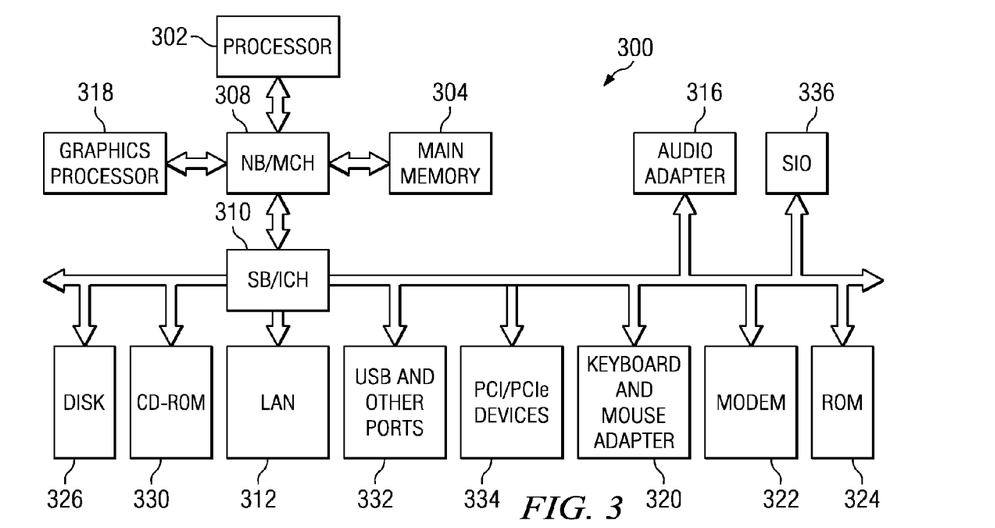
FIG. 3 is a block diagram of a data processing system in which exemplary aspects of the present invention may be implemented.

The present invention provides a method, apparatus and computer program product for presenting disappearing ink for text messaging. The data processing device may be a stand-alone computing device or may be a distributed data processing system in which multiple computing devices are utilized to perform various aspects of the present invention. Therefore, the following FIGS. 1-3 are provided as exemplary diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In accordance with a preferred embodiment of the present invention, two or more of clients 108, 110, 112 run an instant messaging client application. Messages are stored in storage 106 and accessed through server 104. The instant messaging client application receives text messages entered through an input device and sends the messages to server 104. The instant messaging client application also periodically polls server 104 for new messages. The conversation is presented in a display area.

Some existing instant messaging clients include a logging feature, which allows participants to review past conversations. In some cases, however, participants may not want the instant messaging session logged. For example, participants in an instant messaging session may disclose sensitive business, financial, or personal information. Even if logging could be disabled, participants could use other measures to record instant messaging content. For example, a user could copy and paste the text in the display of the instant messaging client application to another application, such as a text editor. This may be disabled by making the message display area of the instant messaging client application non-editable.

In one preferred embodiment, an instant messaging client disables logging of the session by limiting the amount of time messages are displayed in the instant messaging application interface. Instant messaging clients may negotiate a session policy, which may include a display duration value. When an instant messaging client receives messages during that session, the instant messaging client presents the messages in a message display area and removes them after expiration of the display duration.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or LINUX operating system.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

Figure 4:
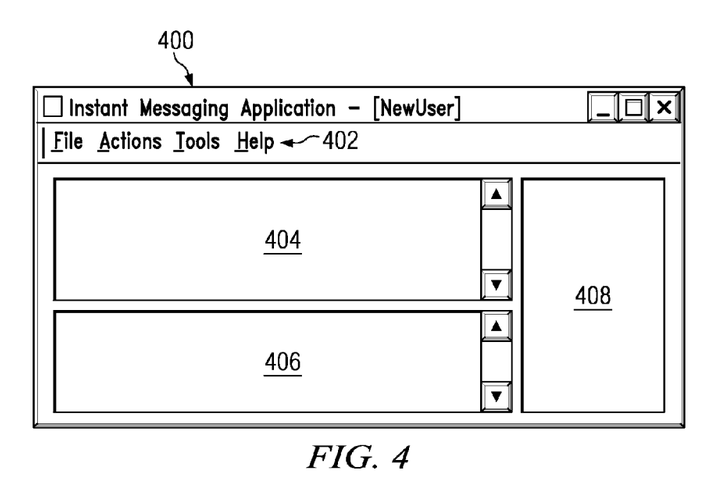
FIG. 4 illustrates an example screen of display for a messaging client in accordance with a preferred embodiment of the present invention.

FIG. 4 illustrates an example screen of display for a messaging client in accordance with a preferred embodiment of the present invention. Messaging application window 400 includes menu bar 402 and session display area 404, message input area 406, and participant display area 408. As the instant messaging client sends or receives messages, the instant messaging client presents the messages in session display area 404. A participant in the messaging session may enter a message in message input area 406 and the instant messaging client sends the message to the remaining participants and presents the message in session display area 404. The instant messaging client presents a list of the participants in the current messaging session in participant display area 408.

Figure 5A:
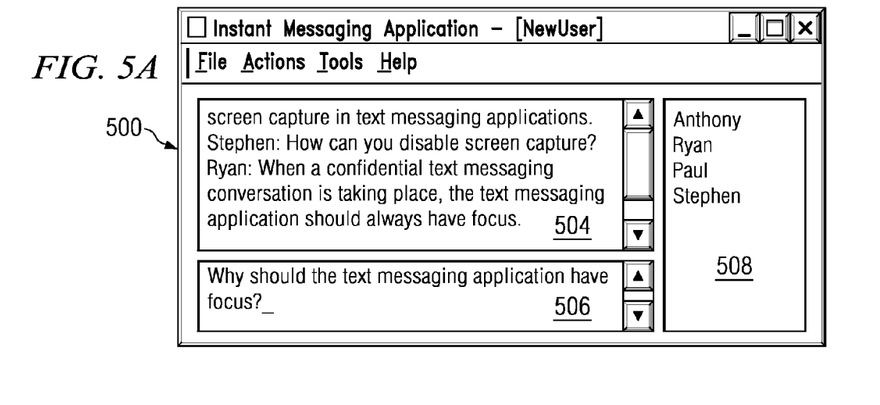
FIG. 5A illustrates an example screen of display for an instant messaging environment in accordance with a preferred embodiment of the present invention.

FIG. 5 illustrates an example screen of display for an instant messaging environment in accordance with a preferred embodiment of the present invention. Messaging application window 500 includes session display area 504 and message input area 506. In the depicted example, a user composes a message in message input area 506. As the user sends or receives messages, the instant messaging client presents messages in session display area 504. As messages fill up session display area 504, the display interface may scroll the messages so the most recent messages appear in the display area. The user may review past messages by scrolling up using scrollbar 508.

In accordance with a preferred embodiment of the present invention, the instant messaging client disables logging. For example, the instant messaging client may present message display area 504 using a non-editable control. The present application makes the display area non-editable to prevent a user from selecting the text, copying the text, and pasting the text into another application. Also, display area 504 displays messages for a predetermined display duration. When an instant messaging client receives messages during that session, message display area 504 displays the messages and removes them after expiration of the display duration.

Figure 6A:
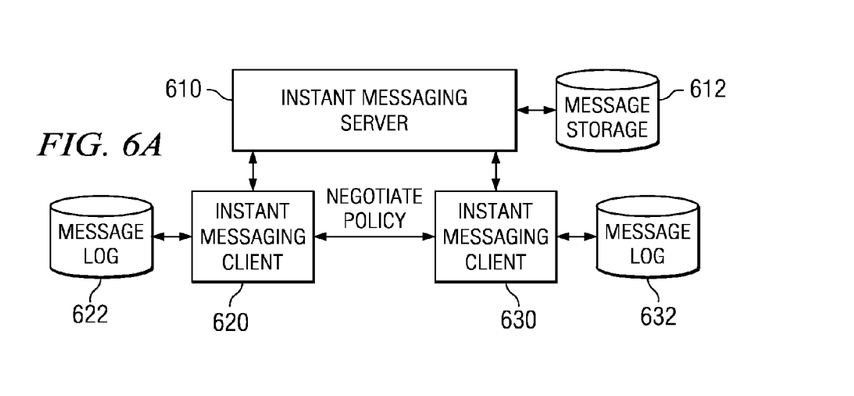
FIGS. 6A and 6B are block diagrams illustrating an instant messaging system in accordance with an exemplary embodiment of the present invention.
Figure 6B:
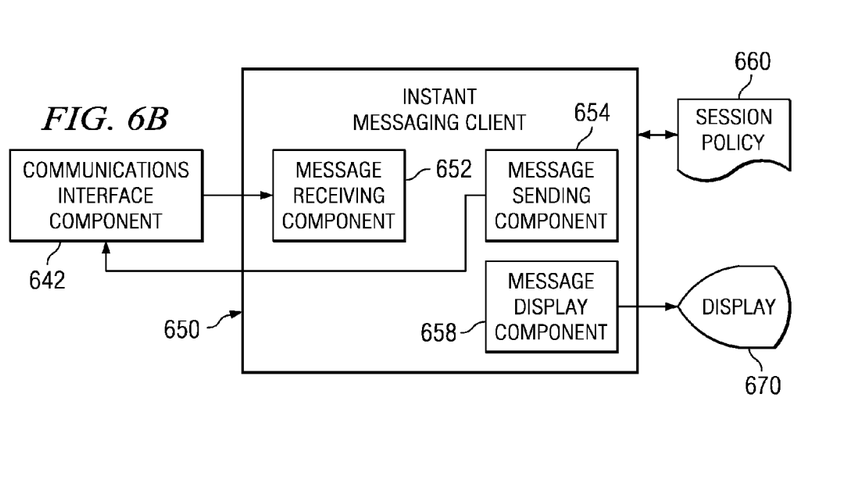

FIGS. 6A and 6B are block diagrams illustrating an instant messaging system in accordance with an exemplary embodiment of the present invention. More particularly, with reference to FIG. 6A, instant messaging clients 620, 630 communicate through instant messaging server 610. As a preliminary step, instant messaging clients 620, 630 may negotiate a policy for the messaging session. A method and apparatus for negotiating session policies is described in further detail in copending patent application Ser. No. 10/870,530, entitled "AWARENESS AND NEGOTIATION OF PREFERENCES FOR IMPROVED MESSAGING," filed on Jun. 17, 2004, and herein incorporated by reference. More specifically, participant clients 620, 630 may negotiate a policy that defines parameters for the messaging session. In a preferred embodiment, the policy indicates that the messaging session is not to be logged. Instant messaging clients 620, 630 may include instant messaging client applications that are trusted and secure. The policy negotiation step may include an authentication step that authenticates whether the other participants are using a trusted instant messaging application.

As users compose messages and clients 620, 630 send the messages, instant messaging server 610 stores the messages in message storage 612. Instant messaging clients 620, 630 periodically poll instant messaging server 610 to determine whether new messages are available for the respective participant. Conventionally, if new messages are available for the participant of instant messaging client 620, the client application downloads the messages, displays the messages, and stores the message in message log 622. Similarly, in a conventional instant messaging system, if new messages are available for the participant of instant messaging client 630, the client application of client 630 downloads the messages, displays the messages, and stores the messages in message log 632. However, if the participants have negotiated a policy that indicates that the instant messaging session is not to be logged, then messages are not stored in message logs 622, 632.

FIG. 6B illustrates an instant messaging client environment in accordance with an exemplary embodiment of the present invention. Instant messaging client 650 includes message receiving component 652, which receives new messages through communications interface component 642. Message sending component 654 sends messages composed using instant messaging client 650 to the other participants in the session through communications interface component 642. Message display component 658 presents messages sent and received in the instant messaging session on an output device, such as display 670.

In a preferred embodiment, the session policy 660 defines a display duration value. When instant messaging client 650 receives messages from other participants during that session, message display component 658 displays the messages in a message display area and removes them after expiration of the display duration. Each message may be associated with a display time and when the current time differs from the display time by a predetermined amount, instant messaging client 650 removes the message from the display.

Alternatively, a header for each message may provide information including a time stamp. For example, the header of the message may include a time stamp. The header may also include an expiration time or display duration value. In the case where instant messaging client 650 negotiates a policy that defines a display duration value, the header information may be ignored or, alternatively, may be used to override the policy.

Figure 7A:
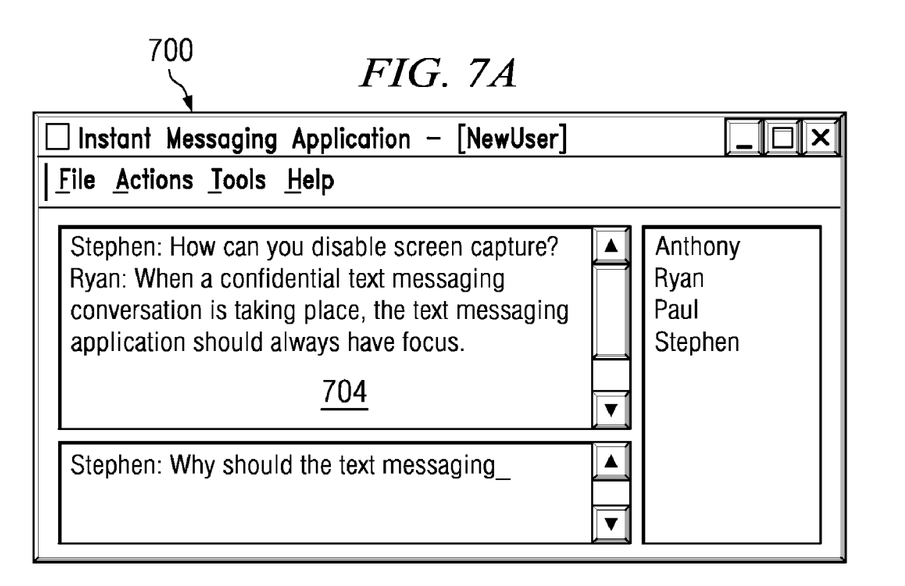
FIGS. 7A and 7B illustrate example screens of display for an instant messaging environment in which message content is erased in accordance with a preferred embodiment of the present invention.
Figure 7B:
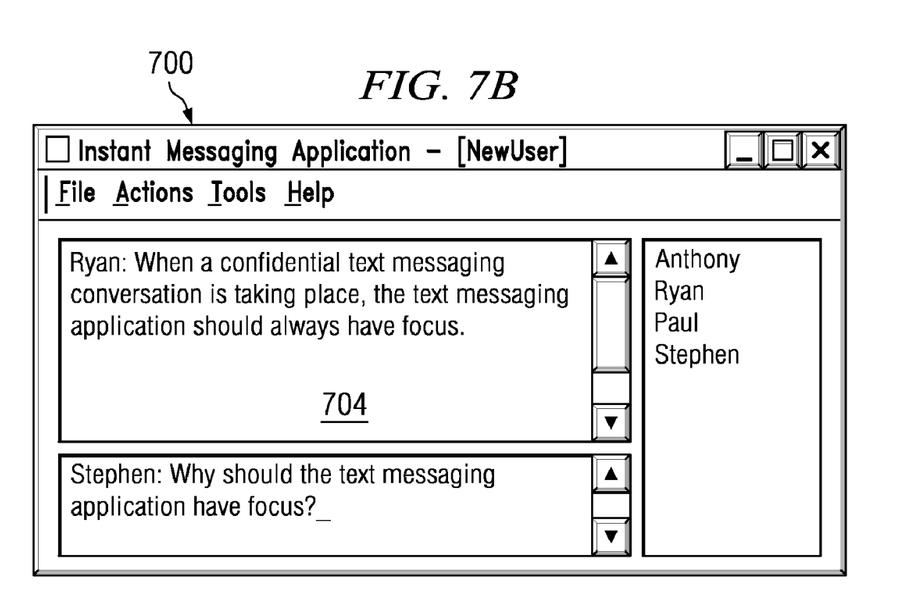

FIGS. 7A and 7B illustrate example screens of display for an instant messaging environment in which message content is erased in accordance with a preferred embodiment of the present invention. With reference to FIG. 7A, instant messaging application 700 presents messages in message display area 704. With reference now to FIG. 7B, after the display duration expires for the first message, the instant messaging application removes the first message from display area 704. As a result, onlookers are given less time to remember and possibly record the contents of the instant messaging session.

Figure 8:
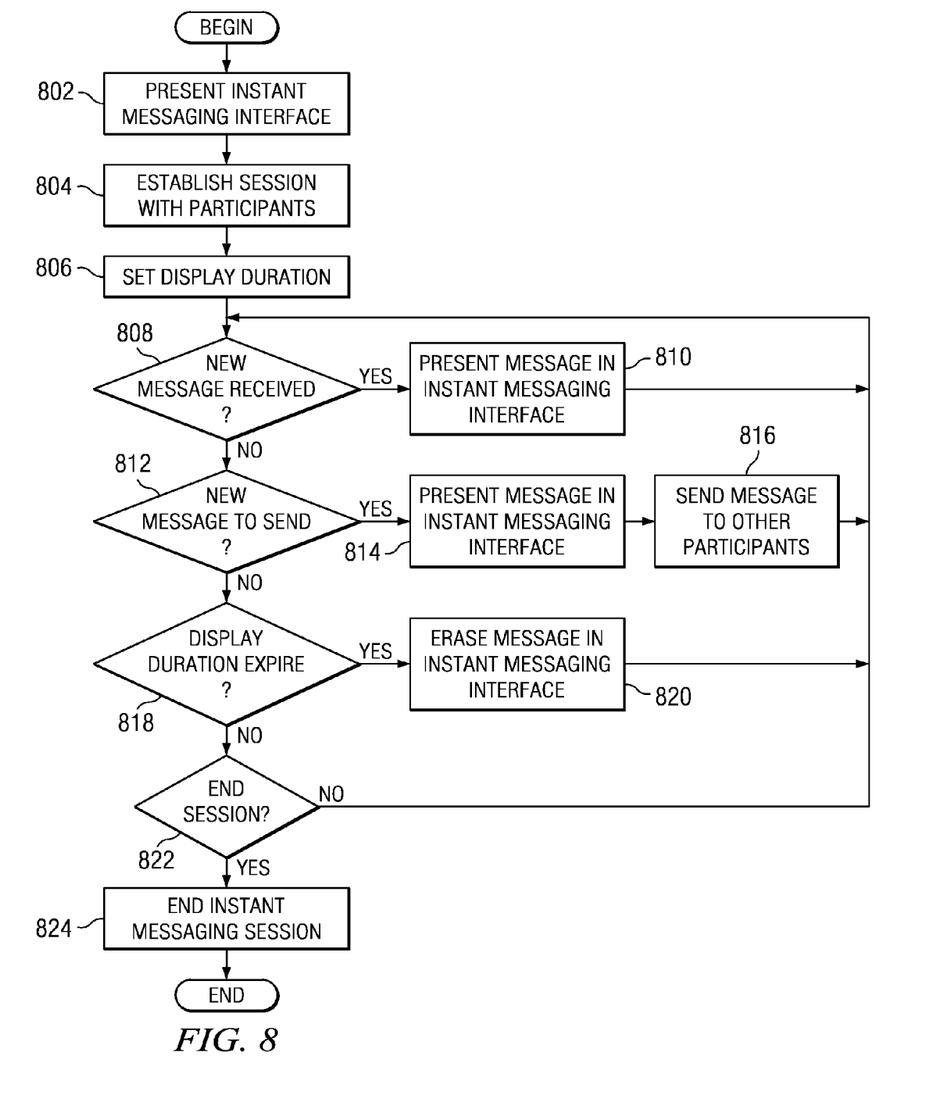
FIG. 8 is a flowchart illustrating the operation of an instant messaging client in accordance with an exemplary embodiment of the present invention.

FIG. 8 is a flowchart illustrating the operation of an instant messaging client in accordance with an exemplary embodiment of the present invention. Operation begins and the instant messaging client presents an instant messaging interface to the user (block 802). The instant messaging client then establishes a session with other participants (block 804). Establishing a session may include negotiating a policy for the instant messaging session, as described above. The instant messaging client sets a display duration (block 806). The display duration may be set, for example, as defined in the session policy. However, the display duration value may be set by other means, such as, for example, by defining a default value.

Next, the instant messaging client determines whether a new message is received (block 808). This determination may be made by a polling function wherein the instant messaging client polls an instant messaging server continuously or on a timed basis. For example, the instant messaging client may poll an instant messaging server for new messages every second; however, the polling interval may be longer or shorter depending upon the implementation. If the instant messaging client receives a new message, the instant messaging client presents the message in the instant messaging interface (block 810). Thereafter, operation returns to block 808 to determine whether the instant messaging client receives a new message.

If the instant messaging client has not received a new message in block 808, the instant messaging client determines whether a new message is to be sent (block 812). If the user has composed a new message to send, the instant messaging client presents the message in the instant messaging interface (block 814) and sends the message to the other participants (block 816). Thereafter, operation returns to block 808 to determine whether the instant messaging client has received a new message.

If there is no new message to send in block 812, the instant messaging client determines whether the display duration for a message has expired (block 818). This determination may be made, for example, by the instant messaging client determining whether a current time is equal to or greater than the display time of a message plus the display duration value. Alternatively, this determination may be made by the instant messaging client comparing a current time to an expiration time from a message header, for instance. If a display duration for a message has expired, the instant messaging client erases the message in the instant messaging interface (block 820). Thereafter, operation returns to block 808 to determine whether the instant messaging client has received a new message.

If a display duration for a message does not expire in block 818, the instant messaging client determines whether an end of the session has been reached (block 822). The end of an instant messaging session may be reached if the participant leaves the session or closes the instant messaging client application, for example. The end of an instant messaging session may also be reached, for instance, if the participant is the last remaining participant in the session. If the end of the session is reached, the instant messaging client ends the instant messaging session (block 824) and operation ends. Otherwise, if the end of the instant messaging session is not reached in block 822, operation returns to block 808 to determine whether the instant messaging client has received a new message.

Thus, the present invention solves the disadvantages of the prior art by providing an instant messaging client that presents messages and removes the messages from display after a predetermined amount of time. The predetermined amount of time may be agreed upon by all participants during a policy negotiation. Each message may be associated with a display time and when the current time differs from the display time by a predetermined amount, the instant messaging client removes the message from the display. Messages may also be presented in a non-editable display area to prevent manual logging of the messaging content.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for disabling logging of an instant messaging session, the apparatus comprising:
a bus system;
a storage device connected to the bus system, wherein the storage device includes a set of instructions; and
a processing unit connected to the bus system, wherein the processing unit executes the set of instructions to establish an instant messaging session between two or more participants, wherein establishing an instant messaging session includes authenticating that the two or more participants are using a trusted instant messaging application and negotiating a session policy during a preliminary policy negotiation between the two or more participants that a content associated with the instant messaging session is not to be logged so that the content associated with the instant messaging session is not stored in one or more instant messaging logs and to define and agree upon a display duration value that determines an amount of time a content associated with the instant messaging session is presented in a non-editable message display area in a user interface, and wherein the non-editable message display area prevents a user from selecting, copying, and pasting the content associated with the instant messaging session into another application, and wherein the content of the instant messaging session includes text messages, images, and sounds associated with the instant messaging session; poll an instant messaging server using a polling function to determine whether a new message is received; start a timer when a given message is received, wherein the given message is one of one or more messages associated with the instant messaging session; present the one or more messages associated with the instant messaging session in the non-editable message display area in the user interface; determine whether the display duration value for the given message of the one or more messages has expired, wherein determining whether the display duration value for the given message has expired includes determining whether the timer reached the display duration value; and remove the given message from the non-editable message display area in the user interface to disable logging of the instant messaging session in response to determining that the display duration value for the given message has expired.

2. A computer program product stored in a computer readable storage medium having instructions embodied therein for disabling logging of an instant messaging session, the computer program product comprising:

instructions for establishing an instant messaging session between two or more participants, wherein establishing an instant messaging session includes authenticating that the two or more participants are using a trusted instant messaging application and negotiating a session policy during a preliminary policy negotiation between the two or more participants that a content associated with the instant messaging session is not to be logged so that the content associated with the instant messaging session is not stored in one or more instant messaging logs and to define and agree upon a display duration value that determines an amount of time a content associated with the instant messaging session is presented in a non-editable message display area in a user interface, and wherein the non-editable message display area prevents a user from selecting, copying, and pasting the content associated with the instant messaging session into another application, and wherein the content of the instant messaging session includes text messages, images, and sounds associated with the instant messaging session;

instructions for polling an instant messaging server using a polling function to determine whether a new message is received;

instructions for starting a timer when a given message is received, wherein the given message is one of one or more messages associated with the instant messaging session;

instructions for presenting the one or more messages associated with the instant messaging session in the non-editable message display area in the user interface;

instructions for determining whether the display duration value for the given message of the one or more messages has expired, wherein determining whether the display duration value for the given message has expired includes determining whether the timer reached the display duration value; and instructions for removing the given message from the non-editable message display area in the user interface to disable logging of the instant messaging session in response to determining that the display duration value for the given message has expired.

* * * * *